United States Patent
Hammer et al.

(10) Patent No.: US 9,580,030 B2
(45) Date of Patent: Feb. 28, 2017

(54) BUMPER ASSEMBLIES INCLUDING LOWER REINFORCEMENT MEMBERS

(71) Applicant: Toyota Motor Engineering & Manufacturing North America, Inc., Erlanger, KY (US)

(72) Inventors: Jeremiah T. Hammer, Ann Arbor, MI (US); Aaron R. Steinhilb, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 37 days.

(21) Appl. No.: 14/681,555

(22) Filed: Apr. 8, 2015

(65) Prior Publication Data
US 2016/0297388 A1 Oct. 13, 2016

(51) Int. Cl.
*B60R 21/34* (2011.01)
*B60R 19/34* (2006.01)
*B60R 19/18* (2006.01)

(52) U.S. Cl.
CPC .............. *B60R 19/34* (2013.01); *B60R 19/18* (2013.01); *B60R 21/34* (2013.01); *B60R 2019/1886* (2013.01); *B60R 2021/343* (2013.01)

(58) Field of Classification Search
CPC ................................ B60R 19/34; B60R 21/34
USPC ..................... 296/187.04; 293/133, 102, 120
See application file for complete search history.

(56) References Cited

U.S. PATENT DOCUMENTS

| | | | |
|---|---|---|---|
| 4,466,646 | A | 8/1984 | Delmastro et al. |
| 5,066,057 | A | 11/1991 | Furuta et al. |
| 5,580,109 | A | 12/1996 | Birka et al. |
| 5,988,714 | A | 11/1999 | Akazawa et al. |
| 6,089,628 | A | 7/2000 | Schuster |

(Continued)

FOREIGN PATENT DOCUMENTS

| | | |
|---|---|---|
| EP | 2423051 | 2/2012 |
| GB | 2515396 | 12/2014 |

(Continued)

*Primary Examiner* — Jason S Morrow
(74) *Attorney, Agent, or Firm* — Dinsmore & Shohl LLP

(57) ABSTRACT

A vehicle includes a vehicle support member at an underside of the vehicle. A bumper assembly is at a front of the vehicle and includes a bumper fascia and a bumper reinforcement beam covered by the bumper fascia providing an upper projecting bumper portion. A lower reinforcement member is connected to the vehicle support member at a location below the bumper reinforcement beam in a vehicle vertical direction that is covered by the bumper fascia providing a lower projecting bumper portion. The lower reinforcement member includes a reinforcement body having a rear end connected to the vehicle support member and a front end opposite the rear end. The lower reinforcement member is connected to the bumper fascia and is configured to have a lowered configuration where the front end of the reinforcement body moves downward in the vehicle vertical direction upon impact to the bumper fascia at the lower projecting bumper portion and a raised configuration where the front end of the reinforcement body moves upward, after the bumper fascia contacts the front end of the reinforcement body during the impact.

19 Claims, 8 Drawing Sheets

(56) References Cited

U.S. PATENT DOCUMENTS

| | | |
|---|---|---|
| 6,485,072 B1 | 11/2002 | Werner et al. |
| 6,540,275 B1* | 4/2003 | Iwamoto ................. B60R 19/12 |
| | | 293/109 |
| 6,609,740 B2 | 8/2003 | Evans |
| 6,886,872 B2 | 5/2005 | Matsumoto et al. |
| 7,114,587 B2 | 10/2006 | Mori et al. |
| 7,134,700 B2 | 11/2006 | Evans |
| 7,144,054 B2 | 12/2006 | Evans |
| 7,222,894 B2 | 5/2007 | Suwa |
| 7,581,769 B2 | 9/2009 | Wakabayashi et al. |
| 7,597,383 B2 | 10/2009 | Itou et al. |
| 7,607,720 B2 | 10/2009 | Noyori et al. |
| 7,726,428 B2 | 6/2010 | Kowalski |
| 8,523,251 B1 | 9/2013 | Fortin et al. |
| 8,579,358 B2 | 11/2013 | Meeks et al. |
| 8,714,294 B2 | 5/2014 | Hasegawa et al. |
| 8,911,007 B2 | 12/2014 | Hirose |
| 8,931,825 B2* | 1/2015 | Oota ....................... B60R 21/34 |
| | | 296/187.04 |
| 9,327,662 B1* | 5/2016 | Hammer ................. B60R 19/12 |
| 2003/0034658 A1 | 2/2003 | Cate |
| 2003/0211311 A1 | 11/2003 | Porter et al. |
| 2004/0124643 A1 | 7/2004 | Matsumoto et al. |
| 2004/0130167 A1 | 7/2004 | Mori et al. |
| 2005/0017520 A1 | 1/2005 | Evans et al. |
| 2007/0069535 A1 | 3/2007 | Mohapatra et al. |
| 2007/0284915 A1* | 12/2007 | Hasegawa ............... B60R 19/18 |
| | | 296/187.04 |
| 2008/0001433 A1* | 1/2008 | Noyori .................... B60R 19/12 |
| | | 296/187.04 |
| 2008/0067838 A1 | 3/2008 | Nakamae et al. |
| 2008/0093868 A1* | 4/2008 | Steller .................... B60R 19/18 |
| | | 293/142 |
| 2008/0203744 A1 | 8/2008 | Fortin |
| 2009/0115205 A1* | 5/2009 | Steller .................... B60R 19/12 |
| | | 293/115 |
| 2009/0160203 A1* | 6/2009 | Garg ....................... B60R 19/12 |
| | | 293/120 |
| 2009/0315346 A1 | 12/2009 | Schelberg et al. |
| 2011/0000728 A1 | 1/2011 | Mildner |
| 2011/0204680 A1 | 8/2011 | Fortin |
| 2012/0153643 A1 | 6/2012 | Mana et al. |
| 2013/0026791 A1 | 1/2013 | Huber et al. |
| 2013/0043692 A1 | 2/2013 | Chiba et al. |
| 2013/0168982 A1 | 7/2013 | Ashiya et al. |
| 2013/0175812 A1* | 7/2013 | Ota ........................ B60R 19/34 |
| | | 293/102 |
| 2014/0028051 A1* | 1/2014 | Oota ....................... B60R 21/34 |
| | | 296/187.04 |
| 2014/0084608 A1 | 3/2014 | Hasegawa et al. |
| 2014/0312636 A1 | 10/2014 | Corwin et al. |

FOREIGN PATENT DOCUMENTS

| | | |
|---|---|---|
| JP | 4728314 | 7/2011 |
| JP | 2014184811 | 10/2014 |

\* cited by examiner

1

BUMPER ASSEMBLIES INCLUDING LOWER REINFORCEMENT MEMBERS

TECHNICAL FIELD

The present specification generally relates to bumper assemblies and vehicles that include bumper assemblies, and more specifically, bumper assemblies that include lower reinforcement members.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Generally, under such testing conditions, a bumper assembly that is closer to the ground will decrease a bending moment seen by lower parts of the leg. It may also be desirable to provide lower regions of the legs with a lifting motion, pushing up on the lower part of the leg during leg-impact conditions.

SUMMARY

In one embodiment, a vehicle includes a vehicle support member at an underside of the vehicle. A bumper assembly is at a front of the vehicle and includes a bumper fascia and a bumper reinforcement beam covered by the bumper fascia providing an upper projecting bumper portion. A lower reinforcement member is connected to the vehicle support member at a location below the bumper reinforcement beam in a vehicle vertical direction that is covered by the bumper fascia providing a lower projecting bumper portion. The lower reinforcement member includes a reinforcement body having a rear end connected to the vehicle support member and a front end opposite the rear end. The lower reinforcement member is connected to the bumper fascia and is configured to have a lowered configuration where the front end of the reinforcement body moves downward in the vehicle vertical direction upon impact to the bumper fascia at the lower projecting bumper portion and a raised configuration where the front end of the reinforcement body moves upward, after the bumper fascia contacts the front end of the reinforcement body during the impact.

In another embodiment, a method of changing a characteristic of a bumper assembly of a vehicle includes providing a bumper assembly at a front of the vehicle including a bumper fascia. A bumper reinforcement beam is covered by the bumper fascia providing an upper projecting bumper portion and a lower reinforcement member connected to a vehicle support member at a location below the bumper reinforcement beam in a vehicle vertical direction that is covered by the bumper fascia providing a lower projecting bumper portion. The lower reinforcement member includes a reinforcement body having a front end and a rear end. The bumper fascia is connected to the lower reinforcement member at a fastening location. A distance of the front end of the reinforcement body from the ground is increased to a raised configuration by bending the reinforcement body after the bumper fascia contacts the front end of the reinforcement body during an impact.

In another embodiment, a vehicle includes a vehicle support member at an underside of the vehicle. A bumper assembly is located at a front of the vehicle and includes a bumper fascia and a bumper reinforcement beam covered by the bumper fascia providing an upper projecting bumper portion. A lower reinforcement member is connected to the vehicle support member at a location below the bumper reinforcement beam in a vehicle vertical direction that is covered by the bumper fascia providing a lower projecting bumper portion. The lower reinforcement member includes a monolithic reinforcement body having a rear end connected to the vehicle support member and a front end opposite the rear end. The lower reinforcement member is connected to the vehicle support member and is configured to have a raised configuration where the front end of the reinforcement body moves upward, after the bumper fascia contacts the front end of the reinforcement body during an impact at the lower projecting bumper portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper assembly including a bumper fascia and a bumper reinforcement beam that extends in a vehicle lateral direction that is covered by the bumper fascia forming an upper projecting bumper portion. A lower projecting bumper portion is located below the upper projecting bumper portion, nearer to the ground or road surface. The lower projecting bumper portion is formed by the bumper fascia covering a lower reinforcement member that is cantilevered to a vehicle support member and extends longitudinally forward, under hanging the bumper reinforcement beam. As will be described herein, the lower reinforcement member is cantilevered to a vehicle support structure at a rearward end and is shaped and arranged to flex upwardly, away from the ground such that a forward end of the lower reinforcement structure can provide a lifting motion on the lower part of the leg during leg-impact conditions.

Figure 1:
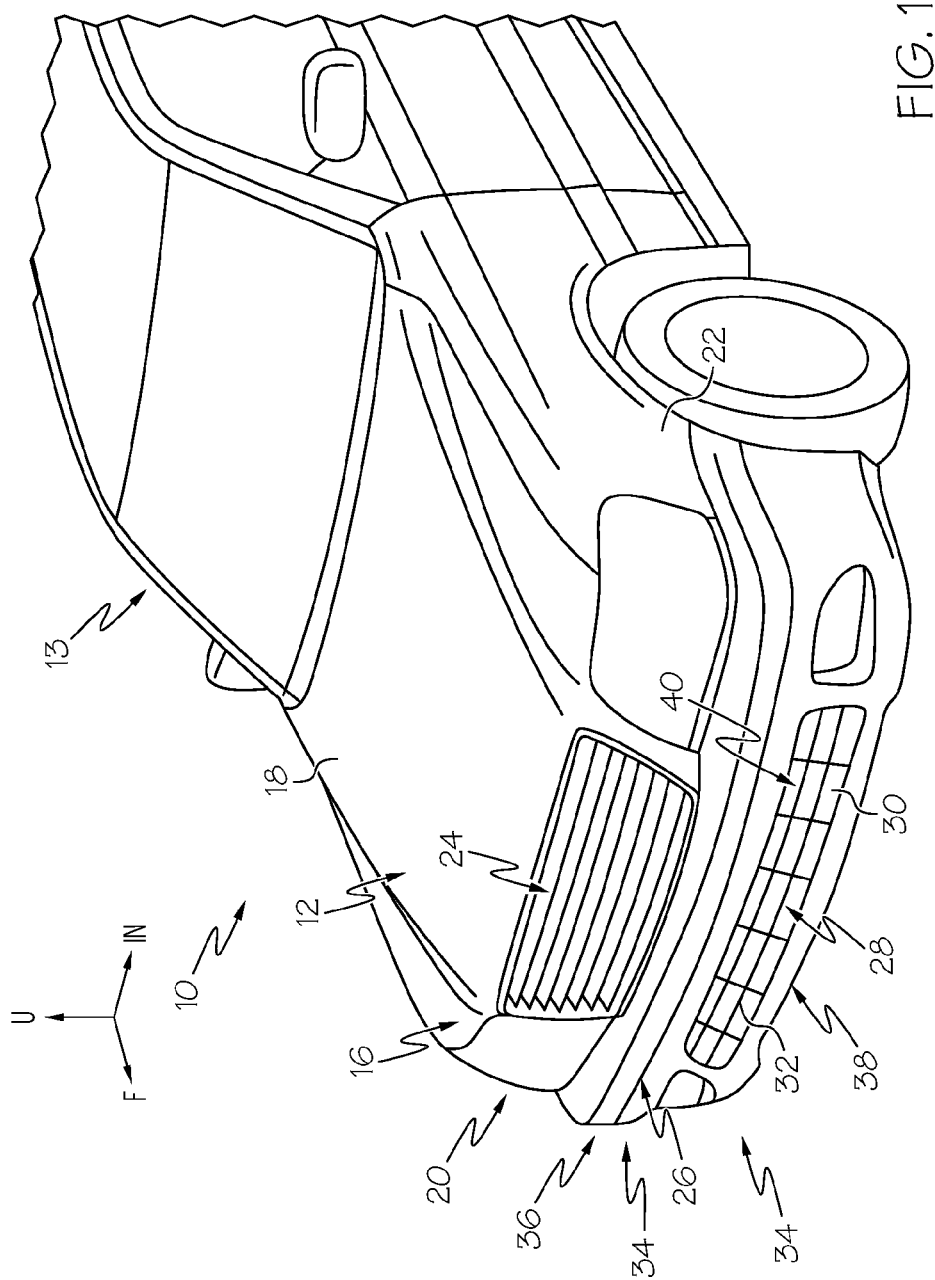
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle F-direction depicted in FIG. 1). The term "vehicle lateral direction" refers to the cross-vehicle direction (i.e., in the +/−vehicle IN-direction depicted in FIG. 1), and is transverse to the vehicle longitudinal direction. The term "vehicle vertical direction" refers to the upward-downward direction of the vehicle (i.e., in the +/−vehicle U-direction depicted in FIG. 1). Further, the terms "inboard" and "outboard" are used to describe the relative positioning of various components of the vehicle with respect to a centerline of the vehicle.

Motor vehicles that incorporate elements according to the present disclosure may include a variety of construction methodologies that are conventionally known, including a unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the lower grille assembly 28 includes a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or bumper fascia 34, an upper projecting bumper portion 36 and a lower projecting bumper portion 38 that under hangs the upper projecting bumper portion 36. The lower grille assembly 28 may be located between the upper projecting bumper portion 36 and the lower projecting bumper portion 38.

Figure 2:
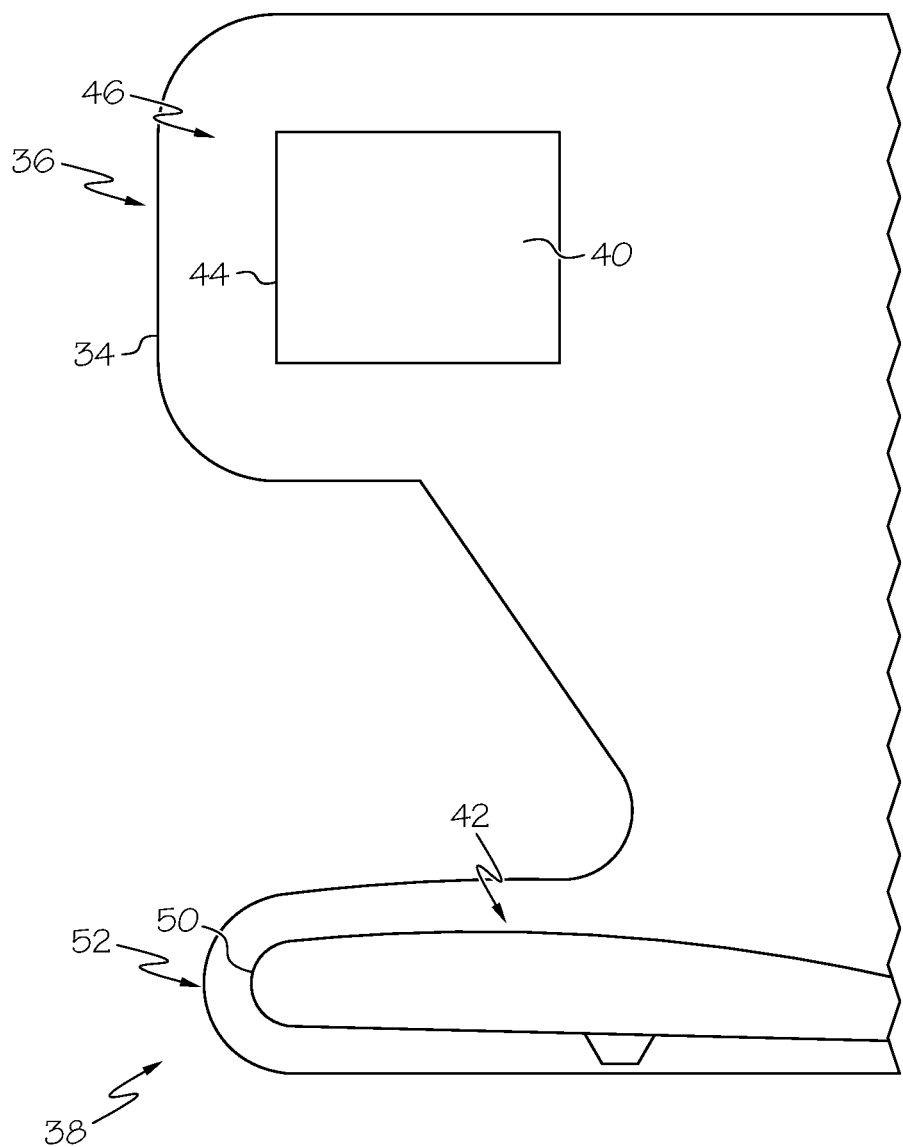
FIG. 2 depicts a diagrammatic sectional side view of a bumper assembly of the vehicle of FIG. 1 according to one or more embodiments shown or described herein.

Referring to FIG. 2, the bumper fascia 34 is an outer covering for covering a bumper reinforcement beam 40 and a lower reinforcement member 42 that both extend in the vehicle lateral direction between the front fenders 20 and 22. The bumper reinforcement beam 40 may generally have a curved shape in the vehicle lateral direction and extend forward in the vehicle longitudinal direction to a front face 44. The bumper fascia 34 also extends forward in the upper projecting bumper portion 36 to cover the bumper reinforcement beam 40. A space 46 may be provided between the bumper fascia 34 and the bumper reinforcement beam 40. The space 46 can allow for some rearward deformation of the bumper fascia 34 at the upper projecting bumper portion 36 before contacting the bumper reinforcement beam 40. In other embodiments, the space 46 may not be provided between the bumper fascia 34 and the bumper reinforcement beam 40. For example, the bumper fascia 34 may be connected directly to the bumper reinforcement beam 40.

The lower reinforcement member 42 is located below or closer to the ground than the bumper reinforcement beam 40 and extends forward in the vehicle longitudinal direction to a front end 50. The bumper fascia 34 also extends forward in the lower projecting bumper portion 38 to cover the lower reinforcement member 42. A space 52 may be provided between the bumper fascia 34 and the lower reinforcement member 42. The space 52 can allow for some rearward deformation of the bumper fascia 34 at the lower projecting bumper portion 38 before contacting the lower reinforcement member 42. In other embodiments, the space 52 may not be provided between the bumper fascia 34 and the lower reinforcement member 42. For example, the bumper fascia 34 may be connected directly to the lower reinforcement member 42 at the front end 50.

Figure 3:
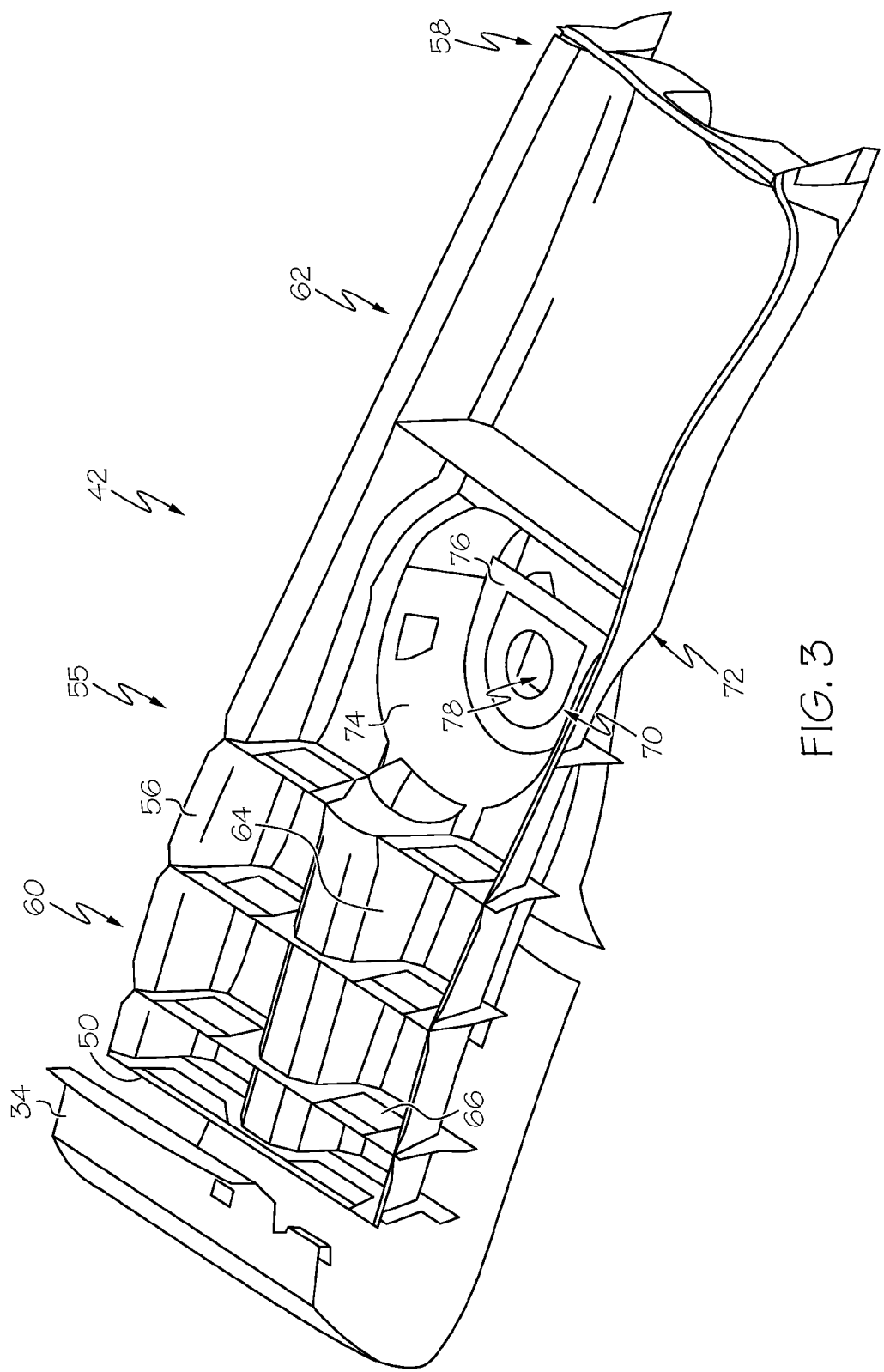
FIG. 3 depicts a perspective view of a lower projecting bumper portion including lower reinforcement member and bumper fascia according to one or more embodiments shown or described herein.

FIG. 3 illustrates a vehicle lateral portion 55 of the lower reinforcement member 42 and bumper fascia 34 in isolation to illustrate features of the lower reinforcement member 42. The lower reinforcement member 42 includes a reinforcement body 56 that has the front end 50 and a rear end 58 opposite the front end 50. The reinforcement body 56 may be a monolithic body (i.e., consisting of one piece), which may be formed by any suitable method, such as molding, machining, etc. In some embodiments, the front end 50 may generally have a curved shape; however, other shapes are possible such as straight of any other suitable shape. The reinforcement body 56 can be divided into a front portion 60 and a rear portion 62. The front portion 60 may include a series of longitudinal reinforcement ribs 64 that are spaced-apart in the vehicle lateral direction and a series of lateral reinforcement ribs 66 that are spaced-apart in the vehicle longitudinal direction and intersect the longitudinal reinforcement ribs 64. In some embodiments, the rear portion 62 of the reinforcement body 56 may include one or more of the reinforcement ribs 64, 66.

A fascia connection structure 70 is provided between the front portion 60 and the rear portion 62 of the reinforcement body 56. The fascia connection structure 70 may be formed as a pocket-shaped protrusion that extends downwardly from a bottom side 72 of the reinforcement body 56 toward the ground at a location spaced from both the front end 50 and the rear end 58. In the illustrated embodiment, the fascia connection structure 70 includes a side wall 74 extending outwardly from the bottom side 72 in the vehicle vertical direction and a connecting base 76 that extends outwardly from the side wall 74 in the vehicle longitudinal direction. The connecting base 76 may include a connector opening 78 extending therethrough for receiving a connecting structure, such as a fastener for fastening the reinforcement body 56 to the bumper fascia 34.

Figure 4:
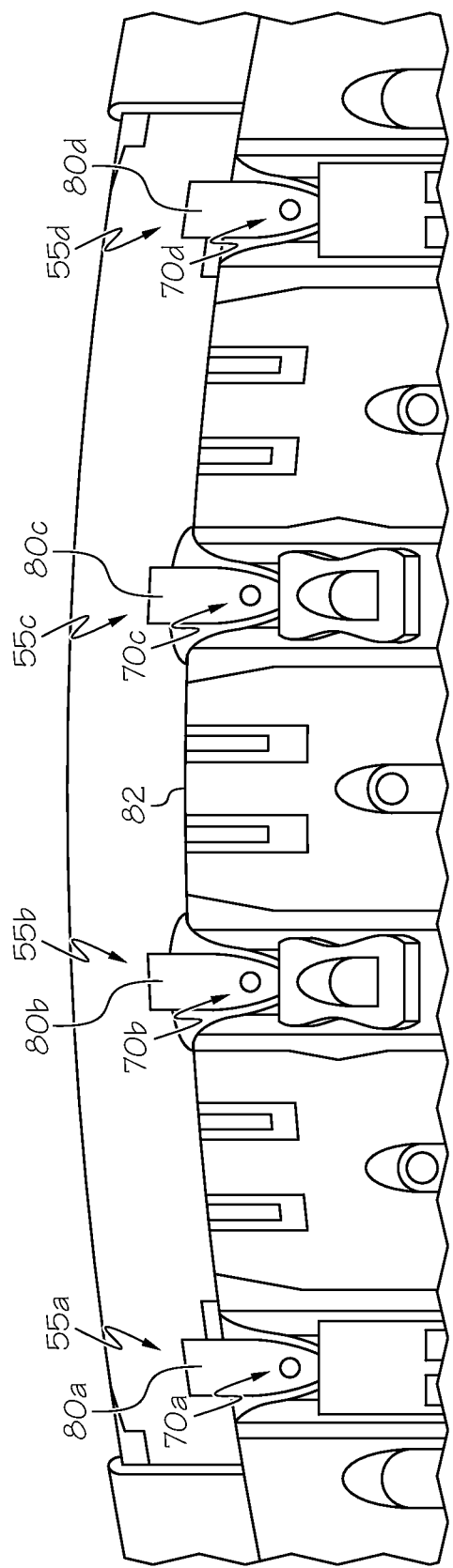
FIG. 4 depicts a bottom view of the lower projecting bumper portion of FIG. 3 according to one or more embodiments shown or described herein.

Referring briefly to FIG. 4, as can be seen, the vehicle lateral portion 55 of the lower reinforcement member 42 and bumper fascia 34 is only one of multiple vehicle lateral portions 55a-55d spaced-apart in the vehicle lateral direction, each having a fascia connection structure 70a-70b. The bumper fascia 34 may include multiple connectors 80a-80d that extend beyond a lower edge 82 of the bumper fascia 34 in the vehicle longitudinal direction. In the illustrated example, the connectors 80a-80d are strip form connectors 80a-80d that may or may not be integrally formed with the bumper fascia 34. For example, in one embodiment, the connectors 80a-80d may be integrally formed with the bumper fascia 34 of the same material using any suitable process and connected to the fascia connection structures 70*a*-70*d*. In another embodiment, the connectors 80*a*-80*d* may be formed separately from the bumper fascia 34 of a rigid or semi rigid material and connected to both the bumper fascia 34 and fascia connection structures 70*a*-70*d* using any suitable connection, such as fasteners thereby forming spaced-apart point connection locations to the lower reinforcement member 42. Materials used to form the connectors 80*a*-80*d*, bumper fascia 34 and lower reinforcement member 42 may include, as examples, thermoplastic olefins (TPOs), polycarbonates, polyesters, polypropylene, polyurethanes, polyamides, or blends of these with, for instance, glass fibers, for strength and structural rigidity. Any suitable methods can be used for forming the connection structures 80*a*-80*d,* bumper fascia 34 and lower reinforcement member 42, such as molding, machining, etc.

Figure 5:
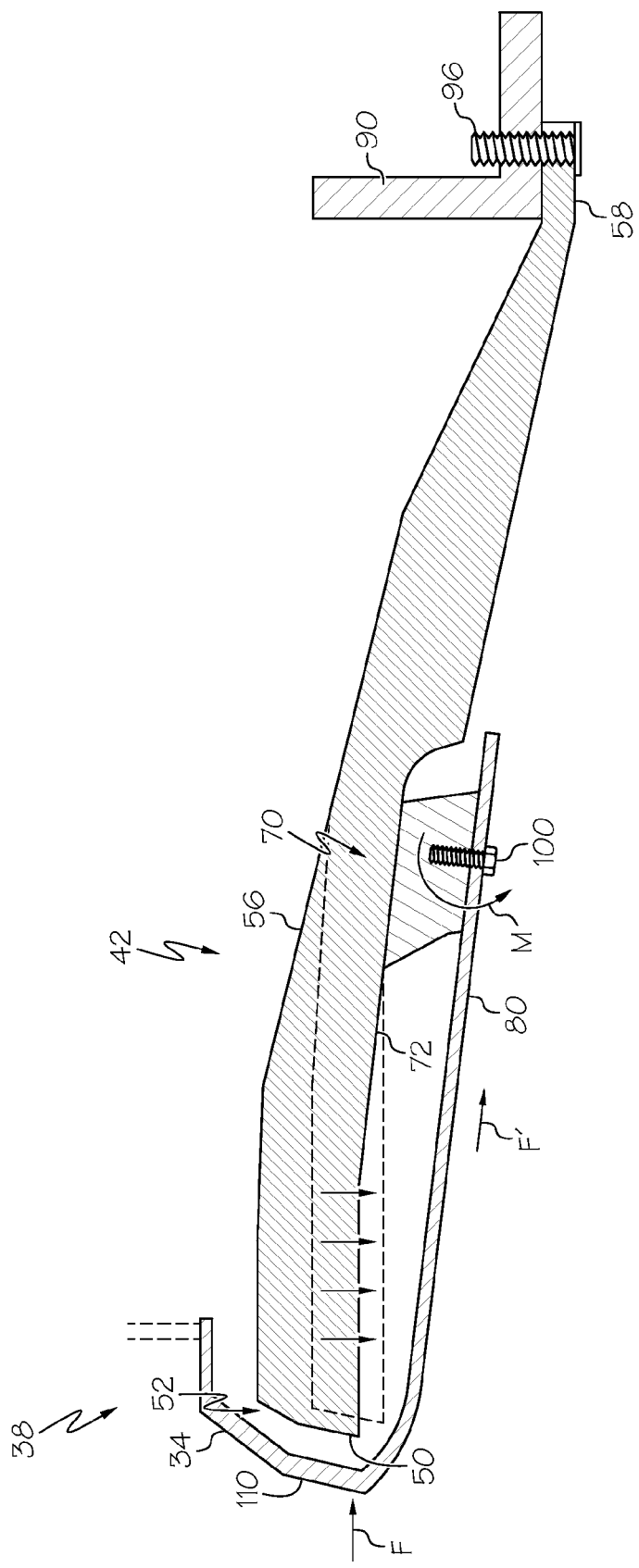
FIG. 5 depicts a diagrammatic side section view of the lower projecting bumper portion of FIG. 3 in operation according to one or more of the embodiments shown or described herein.

Referring to FIG. 5, a diagrammatic view of the lower projecting bumper portion 38 including the bumper fascia 34 and the lower reinforcement member 42 is illustrated. The lower reinforcement member 42 includes the reinforcement body 56 that has the front end 50 and the rear end 58 opposite the front end 50. The rear end 58 of the reinforcement body 56 may be fastened or cantilevered at a fastening location 96 to a vehicle support member 90, such as a lower radiator support and/or other suitable load-bearing structure configured to support the lower reinforcement member 42 in the illustrated position and to operate under impact conditions. The lower reinforcement member 42 extends from the rear end 58 that is cantilevered to the vehicle support member 90 forward in the vehicle longitudinal direction to the front end 50. In some embodiments, the front end 50 may be elevated in the vehicle vertical direction higher or further from the ground than the rear end 58 creating a somewhat downward slope from the front end 50 to the rear end 58.

The fascia connection structure 70 is provided between the front portion 60 and the rear portion 62 of the reinforcement body 56. The fascia connection structure 70 extends downwardly from the bottom side 72 of the reinforcement body 56 to a fastening location 100. In some embodiments, the fascia connection structure 70 places the fastening location 100 between the fastening location 96 of the rear end of the reinforcement body 56 and the bottom side 72 at the front end 50 of the reinforcement body 56 in the vehicle vertical direction. The fastening location 100 may also place the connectors 80 below a front face 110 of the lower projecting bumper portion 38 of the bumper fascia 34 creating a somewhat downward slope from the front face 110 of the bumper fascia 34 to the fastening location 100 of the connectors 80.

FIG. 5 illustrates operation of the lower reinforcement member 42 during an impact. As a force F impacts the front face 110 of the bumper fascia 34, the bumper fascia 34 tends to deflect rearwardly in the vehicle longitudinal direction, particularly in light of the space 52 provided between the bumper fascia 34 and the lower reinforcement member 42. As the front face 110 of the bumper fascia 34 deflects rearwardly, a force F' is applied through the connectors 80 at the fastening location 100 between the reinforcement body 56 and the connectors 80, which, in this example, has both vertical (downward) and horizontal (rearward) components. This force F' can produce a bending moment in the direction of arrow M, which tends to pull the front end 50 of the reinforcement body 56 downwardly in the vehicle vertical direction thereby decreasing the distance between the front end 50 of the reinforcement body 56 to the ground (illustrated by dashed lines), at least initially (e.g., before the bumper fascia 34 contacts the front end 50 of the reinforcement body 56) under relatively low impact forces, such as less than 10 kN, such as less than 5 kN, such as less than 1 kN, such as between 1 kN and 10 kN. At higher impact forces, such as greater than 10 kN, the front end 50 of the reinforcement body 56 may move upwardly (e.g., after the bumper fascia 34 contacts the front end 50 of the reinforcement body 56), increasing the distance of the front end 50 from the ground.

Figure 6:
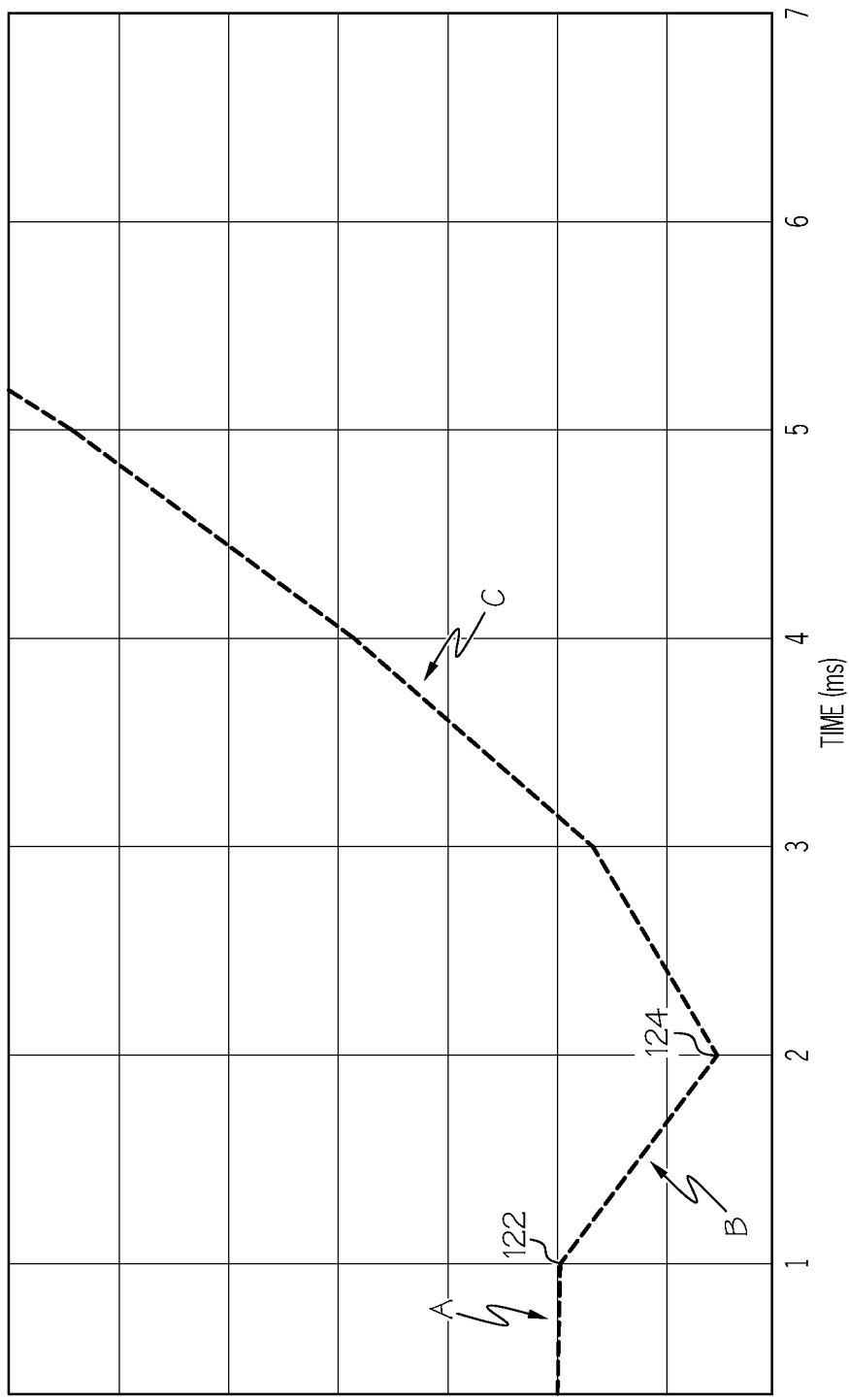
FIG. 6 illustrates an exemplary plot of movement at a front end of the lower reinforcement member versus time during an impact.

Referring to FIG. 6, vertical movement or distance from the ground of the front end 50 of the reinforcement body 56 is shown over time in milliseconds. This movement and timing are exemplary and not intended to be limiting as movement and timing may be more or less depending, at least in part, on the impact conditions, shape and positioning of the lower reinforcement member, etc. Section A of movement line 120 illustrates a baseline position of the front end 50 of the reinforcement body 56 under normal vehicle operating conditions and without impact. Upon an impact to the bumper fascia 34 at the lower projecting bumper portion 38 at impact point 122, the front end 50 of the reinforcement body 56 moves downward thereby decreasing a distance between the front end 50 and the ground in a somewhat linear fashion in section B. This movement can occur before contact is made between the bumper fascia 34 and the front end 50 of the reinforcement body 56 due to the space 52 (FIG. 5). As one example, the distance between the front end 50 of the reinforcement body 56 and the ground may decrease for about 1 millisecond and a distance of about 1.5 millimeters. As the impact forces increase, the front end 50 of the reinforcement body 56 begins an ascent at turnaround point 124 at section C thereby increasing in distance from the ground from the turnaround point 124. While a distance of descent of about 1.5 mm is illustrated, movement of the front end 50 of the reinforcement body 56 toward the ground may be between about 1 mm and about 5 mm.

Figure 7:
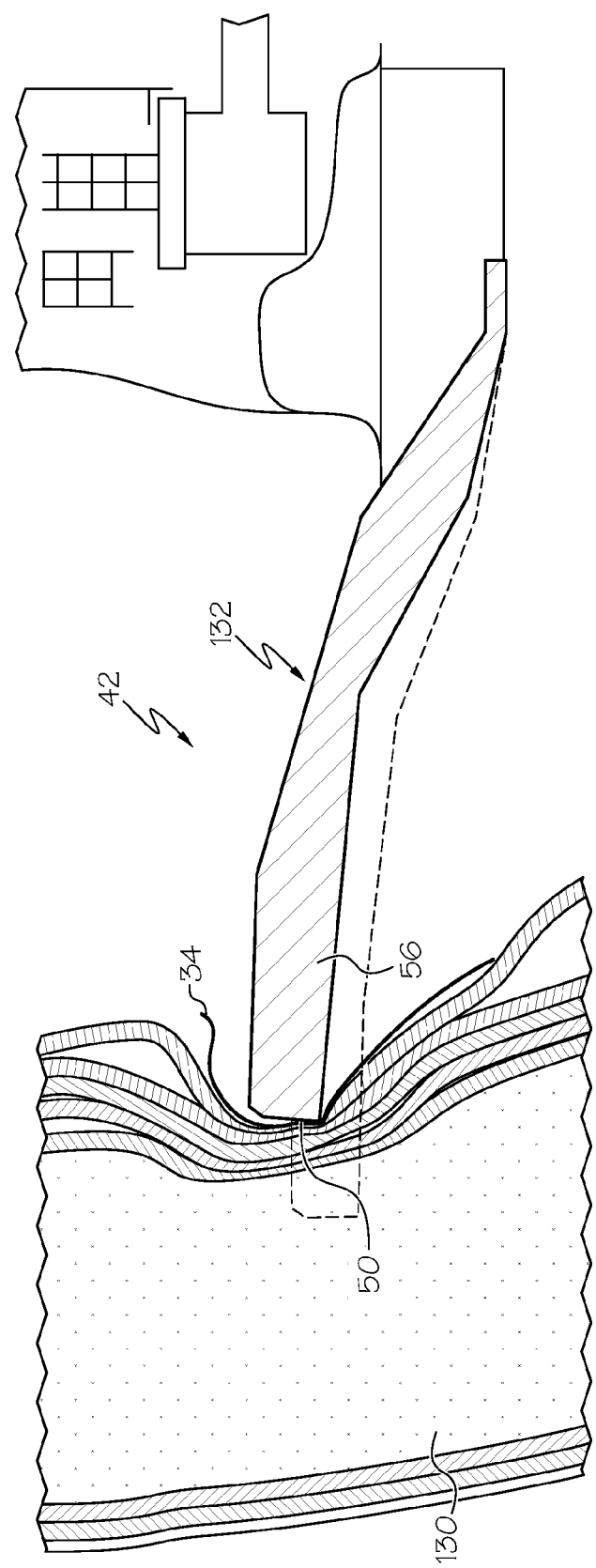
FIG. 7 depicts another diagrammatic side section view of the lower projecting bumper portion of FIG. 3 in operation according to one or more of the embodiments shown or described herein.

Referring now to FIG. 7, further operation of the lower reinforcement member 42 during an impact with an impactor 130 is illustrated. At greater impact forces, such as greater than 10 kN, the front end 50 of the reinforcement body 56 moves upward, after the bumper fascia 34 contacts the front end 50 of the reinforcement body 56. Due, at least in part, to the curve-shaped profile of the bumper fascia 34 and the front end 50 of the reinforcement body 56, the increasing impact force and direction from the impactor 130 causes the reinforcement body 56 to deflect, particularly in region 132 having reduced thickness providing a region 132 of weakness, which causes the front end 50 of the reinforcement body 56 to elevate. The elevating front end 50 of the reinforcement body 56 can then provide a lifting force on the impactor 130, which can assist in motion of the impactor 130 toward the hood of the vehicle 10.

Figure 8:
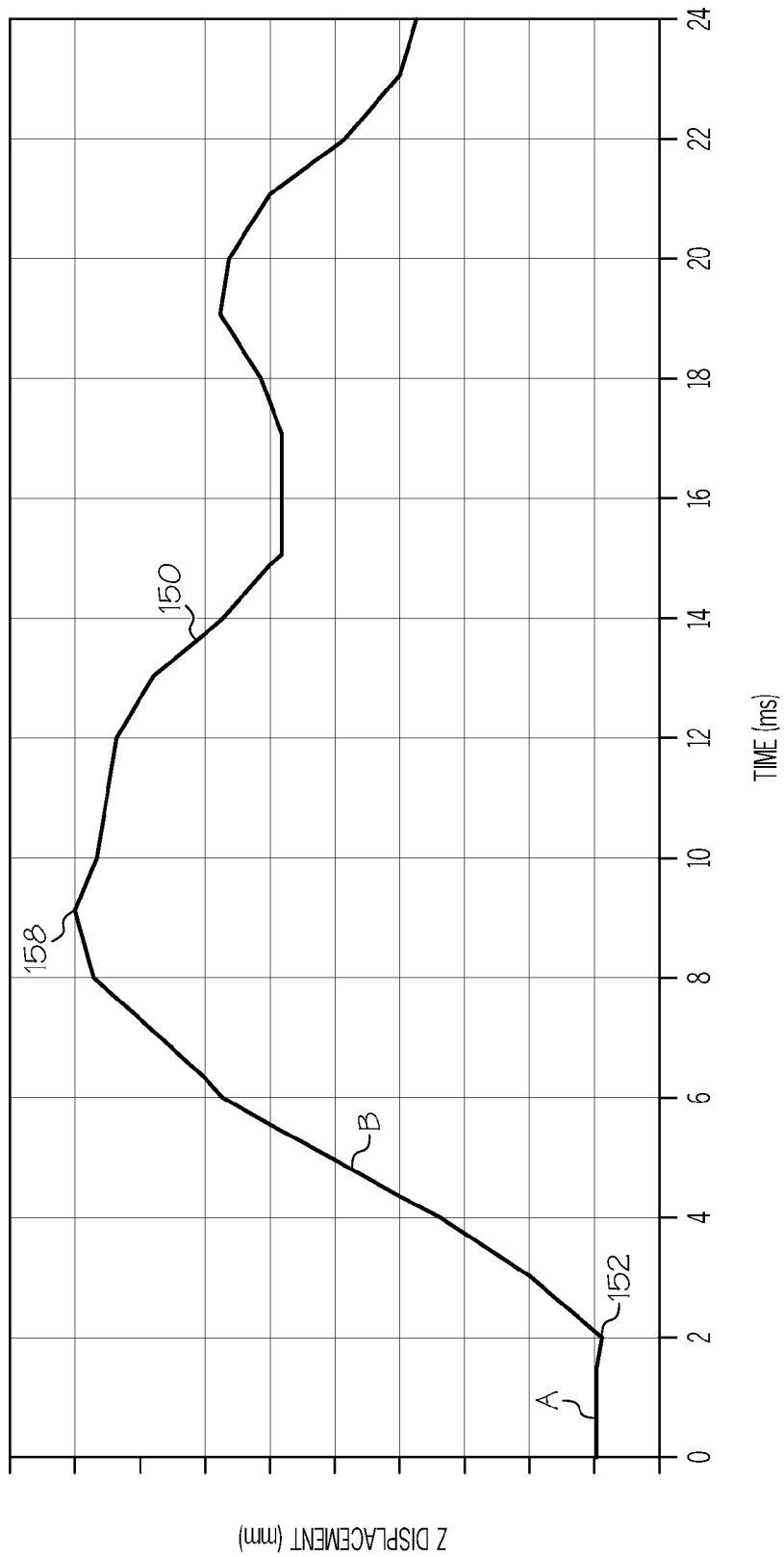
FIG. 8 illustrates another exemplary plot of movement at a front end of the lower reinforcement member versus time during an impact.

Referring to FIG. 8, vertical movement or distance from the ground of the front end 50 of the reinforcement body 56 is shown over time in milliseconds. A suitable test for determining vertical movement of the front end 50 of the reinforcement body 56 is provided by Global Technical Regulations (GTR) No. 9, which is incorporated herein by reference. This movement and timing are exemplary and not intended to be limiting as movement and timing may be more or less depending, at least in part, on the impact conditions, shape and positioning of the lower reinforcement member, etc. Section A of movement line 150 illustrates downward movement of the front end 50 of the reinforcement body 56 upon an impact to the bumper fascia 34 at the lower projecting bumper portion 38. The front end 50 of the reinforcement body 56 moves downward thereby decreasing a distance between the front end 50 and the ground in a somewhat linear fashion, as described above. At turnaround point 152 (herein referred to as the lowered configuration of the front end 50 of the reinforcement body 56), the front end 50 of the reinforcement body 56 begins an ascent at section B of the movement line 150 a distance of ascent (e.g., greater than about 10 mm, such as greater than about 15 mm, between about 5 and about 30 mm, such as between about 10 and about 25 mm, such as between about 15 and about 20 mm) in magnitude to the highest point 158 (herein referred to as the raised configuration of the front end 50 of the reinforcement body 56) that is much greater than the initial distance of descent of the front end 50. In some embodiments, the magnitude of ascent of the front end 50 of the reinforcement body 56 may be at least about 5 times, such as at least about 10 times the magnitude of initial descent of the front end 50. In some embodiments, the time of ascent of the front end may be greater than the time of descent. For example, the time of ascent of the front end 50 of the reinforcement body 56 may be at least about 2 times, such as at least about 4 times the time of descent.

The above-described bumper assemblies provide lower reinforcement members that not only descend during initial stages of impact to lower the front end closer to the ground, but then ascend to provide a lifting force during later stages of the impact. Such a lifting arrangement can provide a lifting force to a tibia of a pedestrian leg, which can reduce influence on knee ligaments and assist in motion onto the hood of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle support member at an underside of the vehicle; and
   a bumper assembly at a front of the vehicle comprising:
      a bumper fascia;
      a bumper reinforcement beam covered by the bumper fascia providing an upper projecting bumper portion; and
      a lower reinforcement member connected to the vehicle support member at a location below the bumper reinforcement beam in a vehicle vertical direction that is covered by the bumper fascia providing a lower projecting bumper portion, the lower reinforcement member includes a reinforcement body having a rear end connected to the vehicle support member and a front end opposite the rear end;
   wherein the lower reinforcement member is connected to the bumper fascia and is configured to have a lowered configuration where the front end of the reinforcement body moves downward in the vehicle vertical direction upon impact to the bumper fascia at the lower projecting bumper portion and a raised configuration where the front end of the reinforcement body moves upward, after the bumper fascia contacts the front end of the reinforcement body during the impact;
   wherein the bumper fascia is connected to the lower reinforcement member at a fastening location that is located below the reinforcement body, the fastening location located at a region of weakness having a reduced thickness in the reinforcement body.

2. The vehicle of claim 1, wherein the lower reinforcement member comprises a fascia connection structure that extends outwardly from a bottom side of the reinforcement body at the region of weakness to a connecting base providing the fastening location.

3. The vehicle of claim 1, wherein the lower reinforcement member extends forward from the vehicle support member in a vehicle longitudinal direction toward the bumper fascia to the front end that is spaced from the bumper fascia in the vehicle longitudinal direction.

4. The vehicle of claim 1, wherein a distance of descent of the front end of the reinforcement body to the lowered configuration is less than a distance of ascent of the front end of the reinforcement body to the raised configuration.

5. The vehicle of claim 1, wherein a distance of ascent of the front end of the reinforcement body is at least about 10 mm to the raised configuration.

6. The vehicle of claim 1, wherein a distance of ascent of the front end of the reinforcement body is between about 5 mm and about 30 mm to the raised configuration.

7. The vehicle of claim 1, wherein a time of ascent of the front end of the reinforcement body to the raised configuration is at least about 2 times a time of descent of the front end of the reinforcement body to the lowered configuration.

8. A method of changing a characteristic of a bumper assembly of a vehicle, comprising:
   providing a bumper assembly at a front of the vehicle comprising a bumper fascia, a bumper reinforcement beam covered by the bumper fascia providing an upper projecting bumper portion and a lower reinforcement member connected to a vehicle support member at a location below the bumper reinforcement beam in a vehicle vertical direction that is covered by the bumper fascia providing a lower projecting bumper portion, the lower reinforcement member includes a reinforcement body having a front end and a rear end, the bumper fascia being connected to the lower reinforcement member at a fastening location that is located below the reinforcement body, the fastening location located at a region of weakness having a reduced thickness in the reinforcement body; and
   increasing a distance of the front end of the reinforcement body from the ground to a raised configuration by bending the reinforcement body after the bumper fascia contacts the front end of the reinforcement body during an impact.

9. The method of claim 8, wherein the reinforcement body is a monolithic body extending from the rear end to the front end.

10. The method of claim 9, therein the rear end is connected to the vehicle support member.

11. The method of claim 8 further comprising lowering a distance of the front end of the reinforcement body from the ground to a lowered configuration during the impact.

12. The method of claim 11, wherein a distance of descent of the front end of the reinforcement body to the lowered configuration is less than a distance of ascent of the front end of the reinforcement body to the raised configuration.

13. The method of claim 11, wherein a distance of ascent of the front end of the reinforcement body is at least about 10 mm to the raised configuration.

14. The method of claim 11, wherein a distance of ascent of the front end of the reinforcement body is between about 5 mm and about 30 mm to the raised configuration.

15. The method of claim 11, wherein a time of ascent of the front end of the reinforcement body to the raised configuration is at least about 2 times a time of descent of the front end of the reinforcement body to the lowered configuration.

16. A vehicle comprising:
   a vehicle support member at an underside of the vehicle; and
   a bumper assembly at a front of the vehicle comprising:
      a bumper fascia;
      a bumper reinforcement beam covered by the bumper fascia providing an upper projecting bumper portion; and
      a lower reinforcement member connected to the vehicle support member at a location below the bumper reinforcement beam in a vehicle vertical direction that is covered by the bumper fascia providing a lower projecting bumper portion, the lower reinforcement member includes a monolithic reinforcement body having a rear end connected to the vehicle support member and a front end opposite the rear end;
   wherein the lower reinforcement member is connected to the vehicle support member and is configured to have a raised configuration where the front end of the reinforcement body moves upward, after the bumper fascia contacts the front end of the reinforcement body during an impact at the lower projecting bumper portion;
   wherein the bumper fascia is connected to the lower reinforcement member at a fastening location that is located below the reinforcement body, the fastening location located at a region of weakness having a reduced thickness in the reinforcement body.

17. The vehicle of claim 16, wherein the lower reinforcement member is connected to the bumper fascia and is configured to have a lowered configuration where the front end of the reinforcement body moves downward in the vehicle vertical direction upon impact to the bumper fascia at the lower projecting bumper portion.

18. The vehicle of claim 16, wherein a distance of ascent of the front end of the reinforcement body is at least about 10 mm to the raised configuration.

19. The vehicle of claim 16, wherein a distance of ascent of the front end of the reinforcement body is between about 5 mm and about 30 mm to the raised configuration.

* * * * *